United States Patent
Ohashi

(10) Patent No.: US 6,309,434 B1
(45) Date of Patent: Oct. 30, 2001

(54) POLISHING COMPOSITION AND METHOD FOR PRODUCING A MEMORY HARD DISKS

(75) Inventor: Keigo Ohashi, Aichi (JP)

(73) Assignee: Fujimi Incorporated, Nishikasugai-gun (JP)

(*) Notice: Subject to any disclaimer, the term of this patent is extended or adjusted under 35 U.S.C. 154(b) by 0 days.

(21) Appl. No.: 09/656,756

(22) Filed: Sep. 7, 2000

(30) Foreign Application Priority Data

Sep. 28, 1999 (JP) .................................................. 11-273502

(51) Int. Cl.$^7$ .............................. C09G 1/02; C09G 1/04; C09K 3/14
(52) U.S. Cl. ................................ 51/308; 106/3; 510/165; 510/167
(58) Field of Search .................................. 51/308; 106/3; 252/79.1; 510/165, 167, 397, 511, 175; 438/692, 693

(56) References Cited

U.S. PATENT DOCUMENTS

| | | |
|---|---|---|
| 5,575,837 | 11/1996 | Kodama et al. . |
| 5,958,288 | 9/1999 | Mueller et al. . |
| 5,980,775 | 11/1999 | Grumbine et al. . |
| 5,997,620 | 12/1999 | Kodama et al. . |
| 6,015,506 * | 1/2000 | Streinz et al. ....................... 510/175 |
| 6,015,813 | 1/2000 | Jeppesen et al. . |
| 6,068,787 * | 5/2000 | Grumbine et al. .................. 252/79.1 |
| 6,136,711 * | 10/2000 | Grumbine et al. ................... 438/692 |

FOREIGN PATENT DOCUMENTS 0 844 290 A1    5/1998   (EP) .

* cited by examiner

Primary Examiner—Michael Marcheschi
(74) Attorney, Agent, or Firm—Oblon, Spivak, McClelland, Maier & Neustadt, P.C.

(57) ABSTRACT

A polishing composition for a magnetic disk substrate to be used for a memory hard disk, which comprises:
  (a) colloidal silica as an abrasive in an amount within a range of from 0.1 to 35 wt % based on the total weight of the composition;
  (b) iron nitrate as a polishing accelerator in an amount within a range of from 0.04 to 2.2 wt % based on the total weight of the composition;
  (c) citric acid as a stabilizer in an amount within a range of from 0.4 to 22 wt % based on the total weight of the composition;
  (d) hydrogen peroxide as a polishing acceleration assistant in an amount within a range of from 0.155 to 9.3 wt % based on the total weight of the composition; and
  (e) water.

18 Claims, No Drawings

POLISHING COMPOSITION AND METHOD FOR PRODUCING A MEMORY HARD DISKS

BACKGROUND OF THE INVENTION

1. Field of the Invention

The present invention relates to a polishing composition useful for finish polishing, particularly final finish polishing, of the surface of a magnetic disk substrate (hereinafter referred to simply as a substrate) in the preparation of a substrate for a magnetic disk to be used for a memory hard disk, i.e. a memory device useful for e.g. a computer. More particularly, the present invention relates to a polishing composition which provides a high stock removal rate in a polishing process for finishing a highly specular surface with a good surface roughness in the preparation of a substrate represented by e.g. a Ni—P disk, a Ni—Fe disk, an aluminum disk, a boron carbide disk or a carbon disk, and which, at the same time, is capable of presenting an excellent polished surface which is useful for a memory hard disk having a large capacity and a high recording density. Further, the present invention relates to a method for producing a memory hard disk by means of such a polishing composition.

2. Discussion of Background

There have been continuing efforts for miniaturization and larger capacity for memory hard disks which are one of memory devices for e.g. computers, and the substrate which is most widely used at present, is one having an electroless Ni—P plating film formed on a blank material. Here, the blank material is one obtained by fairing an aluminum or other base plate by lathe processing by diamond turning, lapping by means of a PVA grindstone prepared by fixing SiC grinding material or other methods, for the purpose of parallelization or planarization. However, by such various fairing methods, a relatively large waviness of the blank material can not completely be removed. And, the electroless Ni—P plating film will be formed along the waviness on the blank material. Accordingly, such a waviness will remain also on the substrate, and nodules or large pits will sometimes be formed on the substrate surface. Here, the "nodules" are bulges having a diameter of at least about 50 μm, which are formed by bulging of a plating surface at such portions that impurities have been taken into the Ni—P plating film. The "pits" are dents formed by polishing on the surface of the substrate, and "fine pits" are dents having a diameter of less than about 10 μm, among them.

Accordingly, for the purpose of removing the waviness of the substrate and making the surface smooth and flat, surface polishing is carried out.

On the other hand, along with the increase in the capacity of memory hard disks, the surface recording density is increasing at a rate of a few tens % per year. Accordingly, the space on a memory hard disk occupied by a predetermined amount of recorded information, is narrower than ever, and the magnetic force required for recording tends to be weak. Accordingly, recently, it is required to minimize the flying height of the head, which is a space between the magnetic head and the memory hard disk, and at present, the flying height of the head is reduced to a level of not higher than 1.0 μinch (about 0.025 μm).

Further, so-called texturing may sometimes be carried out to impart concentric circular scorelines to the substrate after polishing, for the purposes of preventing sticking of the magnetic head for reading or writing information, to the memory hard disk and preventing nonuniformity of the magnetic field on the memory hard disk due to scorelines in a certain direction different from the rotational direction of the memory hard disk, formed on the substrate surface by polishing. Recently, for the purpose of further reducing the flying height of the head, light texturing is carried out wherein the scorelines formed on the substrate are further reduced, or a non-texture substrate free from scorelines, is employed which is not subjected to texturing. The technology to support such a low flying height of the magnetic head has also been developed, and the reduction of the flying height of the head is being increasingly advanced.

When a memory hard disk surface has a waviness, the magnetic head moves up and down following the waviness of the memory hard disk which is rotated at a very high speed. However, if the waviness exceeds a certain height, or if the width of waviness is small relative to the height, the head will no longer be able to follow the waviness, and the head will collide against the substrate surface, thus resulting in so-called "head crush", whereby the magnetic head or the magnetic medium on the memory hard disk surface may be damaged, which may cause a trouble to the memory hard disk device, or which may cause an error in reading or writing information.

On the other hand, head crush may occur also when a micro protrusion of a few μm is present on the memory hard disk surface. Further, when a pit is present on a memory hard disk, it is likely that information can not completely be written in, thus leading to a defect of information so-called a "bit defect" or failure in reading the information, which causes an error.

Accordingly, it is important to minimize the surface roughness of the substrate in the polishing step i.e. the step prior to forming a memory hard disk, and at the same time, it is necessary to completely remove a relatively large waviness as well as micro protrusions, fine pits and other surface defects.

For such a purpose, it used to be common to carry out finishing by one polishing step by means of a polishing composition (hereinafter sometimes referred to as a "slurry" from its nature) comprising aluminum oxide or other various abrasives and water as well as various polishing accelerators. However, by a single polishing step, it has been difficult to satisfy all of the requirements for removing a relatively large waviness as well as surface defects such as nodules and large pits on the substrate surface and for minimizing the surface roughness within a certain period of time. Accordingly, a polishing process comprising two or more steps, has been studied.

In a case where the polishing process comprises two steps, the main purpose of the polishing in the first step will be to remove a relatively large waviness as well as surface defects such as nodules and large pits on the substrate surface, i.e. fairing. Accordingly, a polishing composition is required which has a high ability of correcting the waviness and surface defects without forming deep scratches which can not be removed by polishing in the second step, rather than minimizing the surface roughness. Therefore, as the abrasive in the polishing composition, one having a relatively large particle size is employed for the purpose of increasing the stock removal rate The purpose of polishing in the second step i.e. finishing or final polishing, is to minimize the surface roughness of the substrate. Accordingly, it is required that the polishing composition is capable of minimizing the surface roughness and capable of preventing formation of micro protrusions, fine pits or other surface defects rather than it has a high ability for correcting a large waviness or surface defects as required for polishing in the first step. Further, from the viewpoint of the productivity, it is also required that the stock removal rate is high. The degree of the surface roughness is determined depending upon the process for producing the substrate, the final recording capacity as a memory hard disk and other conditions. However, depending upon the desired degree of surface roughness, a polishing process comprising more than two steps, may be employed.

Recently, an improvement has been made in processing a blank material by means of a PVA grinder in order to reduce the processing cost, whereby it is intended to reduce the surface roughness of a blank material prior to the use of the main polishing composition so the quality relating to the surface roughness or waviness of the substrate prior to the polishing, is brought to a level after the conventional first polishing step. If such a processing is carried out, the conventional first polishing step will be unnecessary, and only so-called finish polishing will be required.

Irrespective of the first or second polishing step, for the purpose of reducing the surface roughness of the substrate, it has been common to carry out polishing by means of a polishing composition prepared in such a manner that aluminum oxide or other abrasive is thoroughly pulverized and adjusted to a proper particle size, water is added thereto, and aluminum nitrate or various organic acids and other polishing accelerators are incorporated thereto, or a polishing composition comprising colloidal silica and water. However, the polishing by means of the former polishing composition had a problem that the balance between the mechanical component and the chemical component was poor, and micro protrusions or fine pits tended to form. The polishing by means of the latter polishing composition had a problem such that the stock removal rate was so low that it took a long time for polishing, and the productivity was low, roll off (or "dub off") as an index of sagging of an end face of the substrate tended to deteriorate, or washing after the polishing tended to be difficult.

To solve such problems, e.g. JP-A-10-204416 (prior art 1) proposes a polishing composition comprising an abrasive selected from the group consisting of silicon dioxide, aluminum oxide, cerium oxide, zirconium oxide, titanium oxide, silicon nitride and manganese dioxide and an iron compound such as an iron salt of an inorganic or organic acid. This polishing composition has a high stock removal rate and is capable of providing a polished surface having a small surface roughness, when it is used for polishing the substrate. However, from a further study by the present inventors, it has been found that the polishing composition of prior art 1 is required to be further improved in that it is likely to be gelled during the storage for a long time, the polishing efficiency is likely to deteriorate due to the property change as time passes, and the pH of the polishing composition is strongly acidic so as to give irritation to the skin of the user or to cause corrosion of the polishing machine.

SUMMARY OF THE INVENTION

It is an object of the present invention to solve the above-mentioned problems, and to provide a polishing composition which has a high stock removal rate and is capable of providing a polished surface having a small surface roughness and preventing formation of microprotrusions, fine pits and other surface defects, as heretofore required for a polishing composition and which further makes it possible to attain stabilization of the property with time, provides good storage stability for a long time, is capable of suppressing the deterioration of the polishing efficiency and provides an improved handling efficiency, in the finish polishing of the substrate to be used for a memory hard disk.

The present invention provides a polishing composition for a magnetic disk substrate to be used for a memory hard disk, which comprises:

(a) colloidal silica as an abrasive in an amount within a range of from 0.1 to 35 wt % based on the total weight of the composition;

(b) iron nitrate as a polishing accelerator in an amount within a range of from 0.04 to 2.2 wt % based on the total weight of the composition;

(c) citric acid as a stabilizer in an amount within a range of from 0.4 to 22 wt % based on the total weight of the composition;

(d) hydrogen peroxide as a polishing acceleration assistant in an amount within a range of from 0.155 to 9.3 wt % based on the total weight of the composition; and (e) water.

Further, the polishing composition of the present invention is preferably stored as the entirety is divided into a plurality such that at least hydrogen peroxide of component (d) is separated from colloidal silica of component (a), iron nitrate of component (b), citric acid of component (c) and water of component (e).

Still further, the polishing composition of the present invention is preferably characterized in that hydrogen peroxide of component (d) is mixed to colloidal silica of component (a), iron nitrate of component (b), citric acid of component (c) and water of component (e) prior to polishing.

The present invention also provides a method for producing a memory hard disk, which comprises polishing a substrate of a memory hard disk by means of a polishing composition comprising the above components (a) to (e) i.e. colloidal silica, iron nitrate, citric acid, hydrogen peroxide and water.

Further, the method for producing a memory hard disk of the present invention is preferably characterized in that the substrate is a Ni—P disk or an aluminum disk.

The method for producing a memory hard disk of the present invention is further preferably characterized in that a magnetic substrate having a surface roughness of not more than a predetermined value, is polished for final finishing by means of the above-mentioned polishing composition.

Further, the method for producing a memory hard disk of the present invention is preferably characterized in that a substrate having preliminary polishing applied thereto once or more than once to have a surface roughness of not more than a predetermined value, is polished for final finishing by means of the above-mentioned polishing composition.

Still further, the method for producing a memory hard disk of the present invention is preferably characterized in that the surface roughness of the substrate is not more than 25 Å.

Now, the present invention will be described in further detail. It should be understood, however, that the following description is intended to facilitate the understanding of the present invention and by no means restricts the present invention.

Abrasive

The abrasive which is one of the components of the polishing composition of the present invention, is colloidal silica. As a method for producing colloidal silica, it is common to employ a method wherein sodium silicate or potassium silicate is ion-exchanged to obtain ultrafine colloidal silica which is then subjected to grain growth, a method wherein an alkoxysilane is hydrolyzed with an acid or alkali, or a method wherein an organic silicon compound is heated and decomposed in a wet system.

The colloidal silica is to polish a surface to be polished (a substrate surface) by a mechanical action as abrasive grains. Its particle size is usually from 0.005 to 0.5 µm, preferably from 0.01 to 0.2 µm, as the average particle size obtained from the surface area measured by a BET method.

If the average particle size of the colloidal silica exceeds the above-mentioned range, the surface roughness of the polished surface tends to be large, or scratching is likely to result. On the other hand, if it is less than the above-mentioned range, the stock removal rate tends to be very low and impractical.

The content of the colloidal silica in the polishing composition is usually from 0.1 to 35 wt % preferably from 1.0 to 15 wt %, based on the total weight of the composition. If the content of the colloidal silica is too small, the stock removal rate tends to be low, and if it is too large, uniform dispersion can not be maintained, and the viscosity of the composition tends to be so high that the handling will be difficult.

Polishing Accelerator

The polishing accelerator which is one of the components of the polishing composition of the present invention is iron nitrate. The valency of the iron nitrate may be bivalent or trivalent, and it may be hydrated. Namely, even if iron(II) nitrate is used, it will be converted to iron(III) nitrate by the action of hydrogen peroxide which is incorporated in the polishing composition as described hereinafter, whereupon the formed iron(III) nitrate will serve as a practical polishing accelerator, and the final results will be the same whether the iron salt to be added is bivalent or trivalent.

The content of the iron nitrate in the polishing composition of the present invention varies depending upon the valency of the iron nitrate and the state of hydration. However, it is usually from 0.004 to 2.2 wt % based on the total weight of the polishing composition. If the content of the iron nitrate is small, the effect as the polishing accelerator will not efficiently be obtained, whereby the polishing performance tends to be low, such being uneconomical. On the other hand, if it is too large, the effect as the polishing accelerator will not increase, and the polishing efficiency will not be further improved, whereby there may be an economical demerit. Further, the pH becomes so low that the polishing composition may present irritation to the skin of the user or may bring about corrosion to the polishing machine, whereby a due care will be required for its handling.

Polishing Acceleration Assistant

The polishing acceleration assistant which is one of the components of the polishing composition of the present invention is hydrogen peroxide. This is believed to promote the polishing acceleration action of the iron nitrate as the polishing accelerator and maximize the effect of the iron nitrate.

The content of the hydrogen peroxide in the polishing composition may vary depending upon the content of the iron nitrate, but it is usually from 0.155 to 9.3 wt %, preferably from 1.0 to 5.0 wt %, based on the total weight of the polishing composition. If the content of the hydrogen peroxide is small, the polishing efficiency tends to be low, such being uneconomical. On the other hand, if it is too large, the degree for improvement tends to be small, whereby an economical demerit is likely to result. Not only that, oxygen will be formed by the decomposition of an excessive hydrogen peroxide during the storage, whereby the pressure in the container during the storage tends to be excessive, and in an extreme case, the container may break. Accordingly, a due care will be required.

Stabilizer

The stabilizer which is one of the components of the polishing composition of the present invention, is citric acid. By the addition of citric acid, it is possible to suppress decomposition of hydrogen peroxide in the co-existance with iron ions of the iron nitrate. The hydrogen peroxide is susceptible to decomposition in the presence of metal element impurities, particularly transition metal ions, and it is regarded as having low stability in such a component system. Accordingly, a component which suppresses decomposition of hydrogen peroxide, i.e. a stabilizer, is incorporated to stabilize the properties and to suppress deterioration of the polishing ability. As a stabilizer to suppress decomposition of hydrogen peroxide, malonic acid, phosphonic acid, oxalic acid, succinic acid and tartaric acid are, for example, known in addition to citric acid. However, for the polishing composition of the present invention, citric acid is particularly suitable. When other stabilizers are used, the stability is not so effective as in the case of citric acid, although the stability may be improved to some extent over a case where no stabilizer is incorporated.

The content of citric acid in the polishing composition is from 0.4 to 22 wt %, based on the total weight of the composition, preferably from 500 to 2,000 wt %, based on the weight of the iron nitrate. If the content is small, decomposition of hydrogen peroxide in the polishing composition takes place, whereby the stability of the composition will be low, and the maintenance of the composition for a long period of time tends to be difficult. On the other hand, if the content is large, there will be no demerit, but also no additional effects, and an excessive addition is simply uneconomical.

Water

Water which is one of the components of the polishing composition of the present invention may be any one of industrial water, city water, deionized water, ion-exchanged water, distilled water, pure water and ultra pure water. In view of the stability of the polishing composition and undesirability of metal impurities in the polishing process, it is preferred to employ deionized water, ion-exchanged water, distilled water, pure water or ultra pure water, having such impurities removed as far as possible.

Polishing Composition

The polishing composition of the present invention ay be prepared by dispersing or dissolving the above-mentioned respective components, i.e. the colloidal silica as an abrasive is mixed and dispersed in a desired content in water, and the iron nitrate as a polishing accelerator, the hydrogen peroxide as a polishing acceleration assistant and citric acid as a stabilizer, are further dissolved. The method for dispersing and dissolving such components in water, is optional, and they may be dispersed by stirring with a vane type stirrer or by ultra sonic dispersion.

At the time of preparing the above polishing composition, various known additives may further be added for the purposes of stabilizing or maintaining the quality of the product, or depending upon the type of the object to be treated, the polishing conditions or the necessity for other processing conditions. Preferred examples of such additives include (a) celluloses, such as cellulose, carboxymethylcellulose and hydroxyethylcellulose, (b) water-soluble alcohols, such as ethanol, propanol and ethylene glycol, (c)

surfactants, such as a sodium alkylbenzenesulfonate and a formalin condensate of naphthalenesulfonic acid, (d) organic polyanionic substances, such as a lignin sulfonate and a polyacrylate, (e) water-soluble polymers (emulsifiers), such as a polyvinyl alcohol, (f) bactericides, such as sodium arginate and potassium hydrogencarbonate, and (g) soluble metal salts other than iron nitrate.

Further, the above abrasive and the polishing accelerator to be incorporated to the polishing composition of the present invention, may be used for the purpose other than the above described purpose, for example, as an assisting additive to prevent sedimentation of the abrasive.

Further, the polishing composition of the present invention may be prepared and stored or transported in the form of a stock solution having a relatively high concentration, and may be used by diluting it at the time of the actual polishing treatment. The above-mentioned ranges of concentration of the respective components are concentrations at the time of actual polishing treatment. Needless to say, when a method of diluting the composition at the time of use is employed, the polishing composition will be a solution having a higher concentration in the state in which it is stored or transported. Further, from the viewpoint of the handling efficiency, it is preferred that the polishing composition is prepared in such a concentrated form.

Further, in order to prevent decomposition of the hydrogen peroxide during storage of the polishing composition of the present invention, the polishing composition may be stored as divided into two or more compositions. Specifically, the abrasive, the iron nitrate and the citric acid may be prepared and stored in the form of a stock liquid having a high concentration, so that the hydrogen peroxide, may be dissolved when the stock solution is diluted immediately before the polishing operation. By employing such a method, the storage may be made in a relatively high concentration, and even in an environment where the hydrogen peroxide is susceptible to decomposition, such as in a high temperature atmosphere, the gelatin can be prevented to make the storage for a long time possible, and needless to say, it is possible to avoid decomposition of the hydrogen peroxide before the polishing, whereby stabilization of the physical properties of the polishing composition can be secured.

The detailed mechanism is not clearly understood with respect to the reason why the polishing composition of the present invention has a high stock removal rate in polishing a substrate and is capable of providing a polished surface having a small surface roughness with little microprotrusions, fine pits or other surface defects. However, it may be explained as follows taking an electroless Ni—P plated substrate as an example.

With respect to the reason for the high speed in polishing the electroless Ni—P plating formed on the substrate, it is considered that the substrate surface (Ni—P plated surface) is oxidized by the reaction for the conversion of trivalent iron ions of the iron nitrate to bivalent iron ions, and the Ni—P plated surface thereby made brittle, will be readily removed by the mechanical action of the abrasive. It is considered further that iron ions present in the slurry will promote the oxidizing action of the hydrogen peroxide. Further, the hydrogen peroxide present in the slurry will oxidize iron ions converted to a bivalent state to convert them again to a trivalent state, whereby the maximum effects can be obtained even with a relatively low concentration of iron ions. On the other hand, it is considered that the hydrogen peroxide will bring about a proper oxidizing action to the Ni—P plated surface, so that the surface roughness of the substrate will be small, and microprotrusions, fine pits or other surface defects will be little.

Preparation of a Memory Hard Disk

The method for preparing a memory hard disk according to the present invention, comprises polishing a substrate to be used for a memory hard disk by means of a polishing composition comprising the above-described respective components, i.e. colloidal silica, iron nitrate, hydrogen peroxide, citric acid and water.

The substrate of the memory hard disk to be polished may, for example, be a Ni—P disk, a Ni—Fe disk, an aluminum disk, a boron carbide disk, a carbon disk or the like. Among them, it is preferred to employ a Ni—P disk or an aluminum disk.

The method for preparing a memory hard disk of the present invention may employ any conventional polishing method for a memory hard disk or any combination of polishing conditions, so long as the above-described polishing composition is used.

For example, as the polishing machine, a single side polishing machine, a double side polishing machine or other machines may be employed. Further, the polishing pad may be of a suede type, a non-woven type, a flocked type, a raising type or the like.

Further, the polishing composition used in the method for preparing a memory hard disk of the present invention has a high stock removal rate and at the same time provides a flat polished surface. Accordingly, the polishing process can be carried out in one step, or can be carried out in two or more steps under different polishing conditions. In a case where the polishing process is carried out in two or more steps, it is preferred that the polishing step employing the above-described polishing composition will be the final polishing step, i.e. a preliminarily polished substrate will be polished by means of the above-described polishing composition. Further, to carry out the polishing by the polishing composition of the present invention more efficiently, it is advisable to adjust the surface roughness of the preliminarily polished substrate to be Ra=at most 25 Å as measured by a non-contact surface roughness meter (object lens: 40 magnifications).

Now, the embodiments of the present invention will be described in further detail with reference to Examples. However, it should be understood that the present invention is by no means restricted to such specific embodiments.

EXAMPLES 1 to 4 AND COMPARATIVE EXAMPLES 1 to 27

Preparation of Polishing Compositions

As an abrasive, colloidal silica (average particle size: 0.035 $\mu$m) was dispersed in water by means of a stirrer to prepare a slurry having an abrasive concentration of 15 wt %. Then, iron(III) nitrate as a polishing accelerator, hydrogen peroxide as a polishing acceleration assistant and citric acid as a stabilizer, in the amounts as identified in Table 1, were added and mixed thereto, to prepare the respective polishing compositions of Examples 1 to 4 and Comparative Examples 1 to 27. Comparative Example 2 is one composed solely of colloidal silica, Comparative Examples 3 to 6 are ones having colloidal silica and iron(III) nitrate mixed, Comparative Examples 7 to 9 are ones wherein no citric acid was incorporated, Comparative Example 10 is one having colloidal silica and hydrogen peroxide mixed, Comparative Examples 11 to 14 are ones having colloidal silica and citric acid mixed, Comparative Examples 15 to 17 are ones wherein no iron(III) nitrate was incorporated, and Comparative Examples 18 to 27 are ones wherein instead of citric acid as the stabilizer, other stabilizers such as malonic acid were employed.

TABLE 1

| | Colloidal silica (wt %) | Iron(III) nitrate (wt %) | Hydrogen peroxide (wt %) | Additive (Type) | Additive (wt %) | Stock removal rate (μm/min) |
|---|---|---|---|---|---|---|
| Ex. 1 | 15.0 | 0.04 | 3.0 | Citric acid | 0.40 | 0.096 |
| Ex. 2 | 15.0 | 0.12 | 3.0 | Citric acid | 1.2 | 0.098 |
| Ex. 3 | 15.0 | 2.0 | 3.0 | Citric acid | 20 | 0.104 |
| Comp Ex. 1 | 15.0 | 0.02 | 3.0 | Citric acid | 0.20 | 0.065 |
| Comp Ex. 2 | 15.0 | — | — | — | | 0.020 |
| Comp. Ex. 3 | 15.0 | 0.02 | — | — | | 0.023 |
| Comp. Ex. 4 | 15.0 | 0.04 | — | — | | 0.025 |
| Comp Ex. 5 | 15.0 | 1.2 | — | — | | 0.044 |
| Comp Ex. 6 | 15.0 | 2.0 | — | — | | 0.074 |
| Comp Ex. 7 | 15.0 | 0.04 | 3.0 | — | | 0.040 |
| Comp Ex. 8 | 15.0 | 0.2 | 3.0 | — | | 0.072 |
| Comp Ex. 9 | 15.0 | 2.0 | 3.0 | — | | 0.097 |
| Comp Ex. 10 | 15.0 | — | 3.0 | — | | 0.035 |
| Comp Ex. 11 | 15.0 | — | — | Citric acid | 0.20 | 0.038 |
| Comp Ex. 12 | 15.0 | — | — | Citric acid | 0.49 | 0.065 |
| Comp Ex. 13 | 15.0 | — | — | Citric acid | 4.0 | 0.066 |
| Comp Ex. 14 | 15.0 | — | — | Citric acid | 20 | 0.081 |
| Comp Ex. 15 | 15.0 | — | 3.0 | Citric acid | 0.20 | 0.036 |
| Comp Ex. 16 | 15.0 | — | 3.0 | Citric acid | 0.40 | 0.071 |
| Comp Ex. 17 | 15.0 | — | 3.0 | Citric acid | 4.0 | 0.073 |
| Comp Ex. 18 | 15.0 | 0.04 | 3.0 | Malonic acid | 0.20 | 0.088 |
| Comp Ex. 19 | 15.0 | 0.04 | 3.0 | Phosphonic acid | 0.16 | 0.064 |
| Comp Ex. 20 | 15.0 | 0.04 | 3.0 | Adipic acid | 0.29 | 0.081 |
| Comp Ex. 21 | 15.0 | 0.04 | 3.0 | Succinic acid | 0.24 | 0.072 |
| Comp Ex. 22 | 15.0 | 0.04 | 3.0 | Tartaric acid | 0.34 | 0.087 |
| Ex. 4 | 15.0 | 0.04 | 3.0 | Citric acid | 0.40 | 0.105 |
| Comp Ex. 23 | 15.0 | 0.04 | 3.0 | Malonic acid | 0.20 | 0.072 |
| Comp Ex. 24 | 15.0 | 0.04 | 3.0 | Phosphonic acid | 0.16 | 0.057 |
| Comp Ex. 25 | 15.0 | 0.04 | 3.0 | Adipic acid | 0.29 | 0.071 |
| Comp Ex. 26 | 15.0 | 0.04 | 3.0 | Succinic acid | 0.24 | 0.065 |
| Comp Ex. 27 | 15.0 | 0.04 | 3.0 | Tartaric acid | 0.34 | 0.071 |

Preparation of Substrates for Polishing Tests

To prepare substrates for polishing tests of the respective polishing compositions of Examples 1 to 4 and Comparative Examples 1 to 27, firstly, polishing of a first step was carried out under the following conditions to prepare substrates for polishing tests, to carry out evaluation with the substrates by polishing of a second step (finish polishing).

Polishing Conditions (First Step)
  Object to be polished: 3.5" Electroless Ni—P substrate
  Polishing machine: Single side polishing machine Polishing pad: Politex DG (manufactured by Rodel Inc., U.S.A)

Treating pressure: 80 g/cm$^2$

Platen rotational speed: 50 rpm

Dilution of the composition: 1:2 pure water

Supply rate of the polishing composition: 15 cc/min

Polishing time: 5 minutes

Polishing Test

Then, using the respective polishing compositions of Examples 1 to 4 and Comparative Examples 1 to 27, polishing of the second step (finish polishing) was carried out under the following conditions against the substrates already polished in the first step.

Polishing Condition (Second Step)

Object to be polished: 3.5" Electroless Ni—P substrate (already polished in the first step, surface roughness Ra=15 Å)

Polishing machine: Single side polishing machine

Polishing pad: Politex DG (manufactured by Rodel Inc., U.S.A)

Treating pressure: 80 g/cm$^2$

Platen rotational speed: 50 rpm

Dilution of the composition: Stock liquid

Supply rate of the polishing composition: 15 cc/min

Polishing time: 10 minutes

After the polishing, the substrate was sequentially cleaned and dried, and the weight reduction of the substrate by the polishing was measured. The polishing test was repeated three times, and the stock removal rate was obtained from the average. The obtained results are shown in Table 1. With respect to the polishing compositions of Example 4 and Comparative Examples 23 to 27, after the preparation, the compositions were left to stand at room temperature (about 25° C.) for 250 hours and then subjected to polishing tests, so as to ascertain the change with time of the polishing compositions due to incorporation of citric acid.

As is evident from Table 1, in Comparative Examples 2 to 6 and 10 to 14 comprising colloidal silica as an adhesive and either iron nitrate, hydrogen peroxide or citric acid, the stock removal rate was small in each case, whereby it was impossible to obtain high polishing efficiency. Further, in Comparative Examples 3 to 6 and 15 to 17 comprising colloidal silica, and iron nitrate and hydrogen peroxide, or hydrogen peroxide and citric acid, it is evident that when iron nitrate or citric acid was incorporated in a large amount, the stock removal rate became relatively high, but if it is incorporated in a small amount, the stock removal rate tended to be small, whereby it was impossible to obtain high polishing efficiency. Further, in Comparative Example 1 wherein the contents of iron nitrate and citric acid were smaller than the above described ranges, and in Comparative Examples 18 to 22 wherein other stabilizers such as malonic acid were incorporated, it is evident that the stock removal rate was small in each case, whereby it was impossible to obtain high polishing efficiency.

Whereas, in Examples 1 to 3 wherein colloidal silica, iron nitrate, hydrogen peroxide and citric acid were incorporated in the contents within the above described ranges, it is evident that the stock removal rate was high, and it was possible to obtain high polishing efficiency.

On the other hand, in Example 4, wherein after the preparation, the composition was left to stand for 250 hours, the stock removal rate was substantially high as compared with Comparative Examples 23 to 27 wherein the compositions were left to stand in the same manner, and the stock removal rate was even higher than in Example 1 wherein the iron nitrate, etc. were incorporated in the same amounts. This indicates that by the incorporation of citric acid, decomposition of hydrogen peroxide can be suppressed for a long period of time, and stabilization of the physical properties of the polishing composition can be secured, and deterioration of the stock removal rate with time can be suppressed, whereby high polishing efficiency can be obtained.

Further, with respect to the respective substrates after the polishing tests (after polishing of the second step), the surface roughness of the substrates was measured by means of a non-contact type surface roughness meter (object lens: 40 magnifications), whereby there was no substantial difference between Examples and Comparative Examples, and it was found that in both Examples and Comparative Examples, a very smooth surface having a surface roughness Ra of less than 5.0 Å was obtained. Further, scratches were visually observed under a spotlight in a dark room, whereby there was no substantial difference in the number of scratches as between Examples and Comparative Examples, and it was found that in both Examples and Comparative Examples, a good surface with little scratches was obtained.

As described in the foregoing, the polishing composition of the present invention is a polishing composition for a substrate to be used for a memory hard disk, which comprises (a) colloidal silica as an abrasive in an amount within a range of from 0.1 to 35 wt % based on the total weight of the composition, (b) iron nitrate as a polishing accelerator in an amount within a range of from 0.04 to 2.2 wt % based on the total weight of the composition, (c) citric acid as a stabilizer in an amount within a range of from 0.4 to 22 wt % based on the total weight of the composition, (d) hydrogen peroxide as a polishing acceleration assistant in an amount within a range of from 0.115 to 9.3 wt % based on the total weight of the composition, and (e) water.

It is thereby possible to attain a high stock removal rate and obtain a polished surface with a small surface roughness and at the same time, it is possible to prevent formation of microprotrusions, fine pits and other surface defects. Further, it is thereby possible to obtain a polishing composition having high polishing efficiency, whereby stabilization of the physical properties with time can be secured, and storage stability for a long period of time can be obtained. Further, it is possible to obtain a polishing composition having handling efficiency improved without presenting irritation to the skin of the user or without bringing about corrosion to the polishing machine.

In a preferred embodiment, the polishing composition of the present invention is stored as the entirety is divided into a plurality such that at least hydrogen peroxide of component (d) is separated from colloidal silica of component (a), iron nitrate of component (b), citric acid of component (c) and water of component (e), and the hydrogen peroxide of component (d) is mixed to colloidal silica of component (a), iron nitrate of component (b), citric acid of component (c) and water of component (e) prior to polishing.

It is thereby possible to store the composition in a relatively high concentration, to store it for a long time without being gelled even in an environment wherein hydrogen peroxide is susceptible to decomposition such as a high temperature environment and at the same time to avoid decomposition of hydrogen peroxide before the polishing, whereby stabilization of the physical properties of the polishing composition can further be improved.

The method for producing a memory hard disk according to the present invention, is a method which comprises polishing a substrate of a memory hard disk by means of a polishing composition comprising the above components (a) to (e) i.e. colloidal silica, iron nitrate, citric acid, hydrogen peroxide and water.

It is thereby possible to attain a high stock removal rate, to obtain a polished surface having a small surface roughness and to obtain a memory hard disk having little microprotrusions, fine pits and other surface defects and at the same time, it is possible to suppress deterioration of the polishing efficiency with time and to carry out polishing constantly.

Further, in a preferred embodiment of the method for producing a memory hard disk of the present invention, the substrate is a Ni—P disk or an aluminum disk, and the substrate having a surface roughness of not more than a predetermined value, is polished for final finishing by means of the above polishing composition, whereby the stock removal rate is high, a polished surface having a little surface roughness can be obtained, and polishing treatment to prevent formation of microprotrusions, fine pits and other surface defects, can efficiently be carried out.

A further preferred embodiment of the method for producing a memory hard disk of the present invention is a method wherein a substrate having preliminary polishing applied thereto once or more than once to have a surface roughness of more than a predetermined value, is polished for final polishing by means of the above polishing composition, whereby the stock removal rate is high, a polished surface having a small surface roughness can be obtained, and a polishing treatment to prevent formation of microprotrusions, fine pits and other surface defects, can more efficiently be carried out.

Further, a preferred embodiment of the method for producing a memory hard disk of the present invention is a method wherein the surface roughness of the substrate is at most 25 Å, whereby the stock removal rate is high, a polished surface having a small surface roughness can be obtained, and a polishing treatment to prevent formation of microprotrusions, fine pits and other surface defects, can efficiently be carried out.

What is claimed is:

1. A polishing composition for a magnetic disk substrate which comprises:
   (a) colloidal silica in an amount within a range of from 0.1 to 35 wt % based on the total weight of the composition;
   (b) iron nitrate in an amount within a range of from 0.04 to 2.2 wt % based on the total weight of the composition;
   (c) citric acid in an amount within a range of from 0.4 to 22 wt % based on the total weight of the composition;
   (d) hydrogen peroxide in an amount within a range of from 0.155 to 9.3 wt % based on the total weight of the composition; and
   (e) water.

2. The polishing composition according to claim 1, wherein at least hydrogen peroxide is stored separately from the colloidal silica, the iron nitrate, the citric acid and water.

3. A method for producing a memory hard disk substrate, which comprises polishing the magnetic disk substrate with the polishing composition as defined in claim 1.

4. The method according to claim 3, wherein the substrate is a Ni—P disk or an aluminum disk.

5. The method according to claim 3, wherein a substrate having a surface roughness of not more than 25 Å, is polished for final finishing by means of the polishing composition.

6. The method according to claim 3, wherein said polishing comprises one or more preliminary polishing steps, thereby providing a memory hard disk substrate having a surface roughness of not more than 25 Å, which is subsequently polished for final finishing by means of the polishing composition.

7. The polishing composition of claim 1, wherein the colloidal silica is ultrafine colloidal silica.

8. The polishing composition of claim 1, wherein the colloidal silica has an average particle size of 0.01 to 0.2 $\mu$m.

9. The polishing composition of claim 1, wherein the colloidal silica is present in an amount of from 1.0 to 15 wt % based on the total weight of the composition.

10. The polishing composition of claim 1, wherein the hydrogen peroxide is present in an amount of from 1.0 to 5.0 wt % based on the total weight of the composition.

11. The polishing composition of claim 1, further comprising additives selected from the group consisting of celluloses, a water-soluble alcohol, a surfactant, an organic polyanionic substance, a water-soluble polymer, a bacteriacide, a water soluble metal salt other than iron nitrate, and mixtures thereof.

12. The polishing composition of claim 11, wherein said celluloses are selected from the group consisting of cellulose, carboxymethylcellulose, and hydroxyethylcellulose.

13. The polishing composition of claim 11, wherein said water-soluble alcohol is selected from the group consisting of ethanol, propanol, and ethylene glycol.

14. The polishing composition of claim 11, wherein said surfactant is selected from the group consisting of sodium alkylbenzenesulfonate and a formalin condensate of naphthalenesulfonic acid.

15. The polishing composition of claim 11, wherein said organic polyanionic substance is selected from the group consisting of lignin sulfonate and polyacrylate.

16. The polishing composition of claim 11, wherein said water-soluble polymer is polyvinyl alcohol.

17. The polishing composition of claim 11, wherein said bacteriacide is selected from the group consisting of sodium arginate and potassium hydrogencarbonate.

18. The method of claim 3, wherein hydrogen peroxide is mixed with colloidal silica, iron nitrate, citric acid and water prior to polishing.

* * * * *